(12) United States Patent
Nash

(10) Patent No.: US 7,120,658 B2
(45) Date of Patent: Oct. 10, 2006

(54) DIGITAL SYSTOLIC ARRAY ARCHITECTURE AND METHOD FOR COMPUTING THE DISCRETE FOURIER TRANSFORM

(76) Inventor: James G. Nash, 2027 Linda Flora Dr., Los Angeles, CA (US) 90077-1406

(*) Notice: Subject to any disclaimer, the term of this patent is extended or adjusted under 35 U.S.C. 154(b) by 670 days.

(21) Appl. No.: 10/223,176

(22) Filed: Aug. 19, 2002

(65) Prior Publication Data
US 2003/0225805 A1 Dec. 4, 2003

Related U.S. Application Data

(60) Provisional application No. 60/380,494, filed on May 14, 2002.

(51) Int. Cl.
*G06F 17/14* (2006.01)
(52) U.S. Cl. .................................. 708/405
(58) Field of Classification Search ............ 708/405
See application file for complete search history.

(56) References Cited

U.S. PATENT DOCUMENTS

| | | | | |
|---|---|---|---|---|
| 4,777,614 A | * | 10/1988 | Ward ........................ | 708/607 |
| 5,034,910 A | * | 7/1991 | Whelchel et al. .......... | 708/407 |
| 5,093,801 A | | 3/1992 | White et al. | |
| 5,168,460 A | * | 12/1992 | Tower ........................ | 708/407 |
| 5,179,714 A | * | 1/1993 | Graybill .................... | 712/19 |
| 6,023,742 A | | 2/2000 | Ebeling et al. | |
| 6,098,088 A | | 8/2000 | He et al. | |

FOREIGN PATENT DOCUMENTS

GB 2276960 A * 10/1994

OTHER PUBLICATIONS

Kung HT, Leiserson CE "Systolic Arrays (for VlSI)," Symposium on Sparse Matrix Computations, p. 256-282, 1978.

Zhang CN, Yun YY "Multidimensional Systolic Networks for Discrete Fourier Transform," 11 th Annual International Symposium on computer archetecture, p. 215-222, 1984.

Roziner TD, Karpovsky MG "Multidimensional Fourier Transforms by Systolic Archeitecture," Jounal of VLSI Signal Processing, 4, 343-354, 1992.

Marino F, Swatzlander EE"Parallel Implementation of Multidimensional Transforms Without Interprocessor Communication," IEEE Transactions on Computers, vol. 48 No. 9, 1999.

Shietun et al., "Design of Array Processors for 2-D Discrete Fourier Transform," IEEE Trans. Inf. & Syst., vol. E80-D, No. 4, Apr. 1987.

(Continued)

*Primary Examiner*—Tan V. Mai
(74) *Attorney, Agent, or Firm*—Kenneth L. Nash

(57) ABSTRACT

A more computationally efficient and scalable systolic architecture is provided for computing the discrete Fourier transform. The systolic architecture also provides a method for reducing the array area by limiting the number of complex multipliers. In one embodiment, the design improvement is achieved by taking advantage of a more efficient computation scheme based on symmetries in the Fourier transform coefficient matrix and the radix-4 butterfly. The resulting design provides an array comprised of a plurality of smaller base-4 matrices that can simply be added or removed to provide scalability of the design for applications involving different transform lengths to be calculated. In this embodiment, the systolic array size provides greater flexibility because it can be applied for use with any transform length which is an integer multiple of sixteen.

17 Claims, 12 Drawing Sheets

OTHER PUBLICATIONS

Thompson CD, "Fourier Transforms in VLSI," IEEE Transactions on Computers, vol. C-32 No. 11, Nov. 1983.

Izidor et al., "VLSI Architectures for Multidimensional Fourier Tranform Processing," IEEE Transactions on Computers, vol. C-36, No. 11, Nov. 1987.

Jones KJ "High Throughput, Reduced Hardware Systolic Solution to Prime Factor Discrete Fourier Transform Alogorithm," IEEE Proceed., vol. 137, Pt. E, No. 3 May '90.

Marwood et al. "Matrix Product Machine and the Fourier Transform," IEEE Proceedings, vol. 137, Pt. G, No. 4, Aug. 1990.

Choi et al., "A New Linear Systolic array for FFT Computation," IEEE Trans. on Cir. and Syst, II: Analog and Digital Signal Proc. vol. 39, No. 4, Apr. 1992.

Arabepola B "Discrete Fourier Transform Processor Based on the Prime Factor Algorithm," IEEE Proceedings, vol. 130, Pt. G, No. 4, Aug. 1983.

Bayoumi et al. "A VLSI Arraay For Computing the DFT Based on RNS," ICASSP 86 Tokyo, p. 2147-2150, 1986 IEEE.

Beraldin et al. "Efficient One-Dimensional Systolic Array Realization of the Discrete Fourier Transform," IEEE Trans. on Cir. and Syst., vol. 36, No. 1, Jan. 1989, p. 95-100.

Chang et al. "A New Systolic Array for Discrete Fourier Transform," IEEE Trans. on Acoustics, Speech and Sig. Proc., vol. 36, No. 10, Oct. 1988, p. 1665-6.

Shousheng et al. "A New Apporach to Pipeline FFT Processor," Proceedings of 10th Int. Parallel Proc. Symposium, 1063-7133/96, p. 766-770.

Hyesook et al. "Multidimensional Systolic Arrays for the Implementation of Discrete Fourier Transforms," Transactions on Sig. Proc. vol. 47, No. 5, May 1999, p. 1359-70.

Colin et al. "A New FFT Architecture and Chip Design for Motion Compensation Based on Phase Correlation," Proc. of 1996 Int. Conference on Apl-Specific Systems, Archeitectures, and Processors, 1996, p. 83-92.

Sungwook et al. "A Pipelined Architecture for the Multidimensional DFT" IEEE Transactions on Signal Processing, vol. 49, No. 9, Sep. 2001, p. 2096-2102.

* cited by examiner

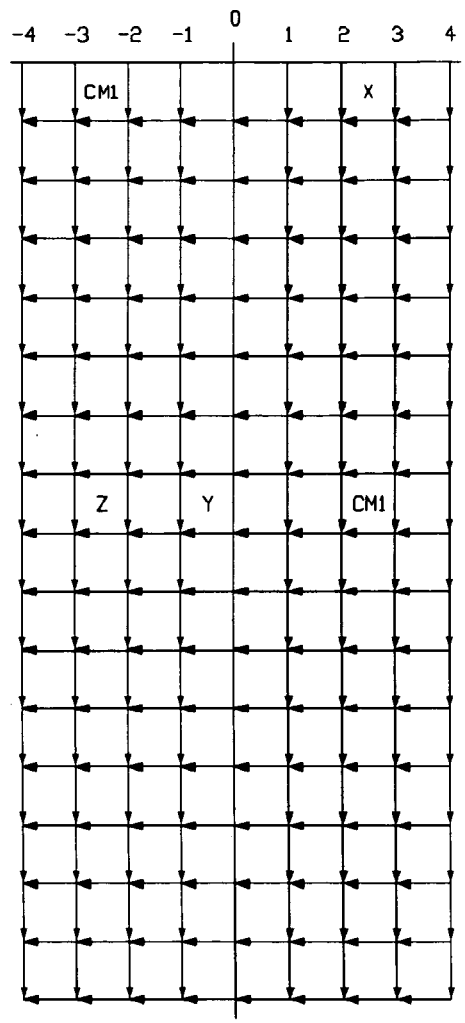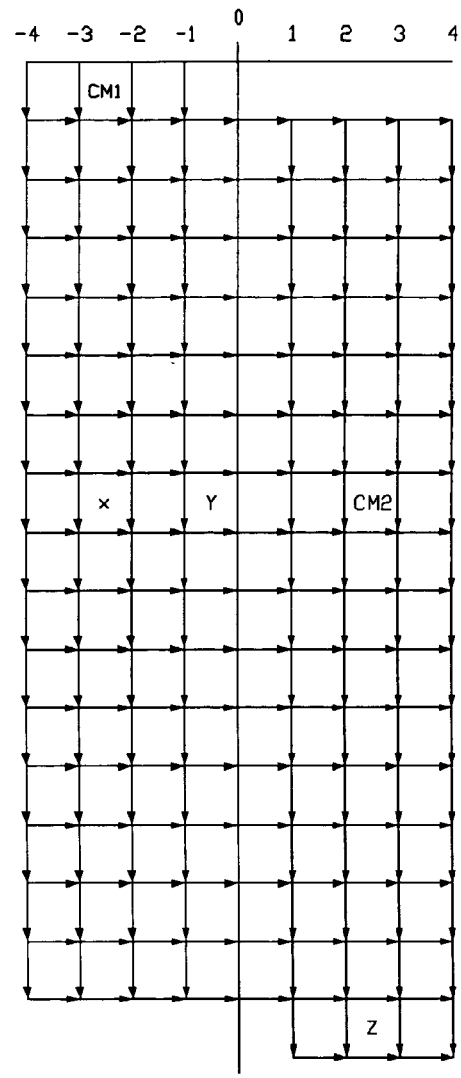
FIG 2A
FIG 2B

DIGITAL SYSTOLIC ARRAY ARCHITECTURE AND METHOD FOR COMPUTING THE DISCRETE FOURIER TRANSFORM

This application claims the benefit of U.S. Provisional Patent Application No. 60/380,494 filed May 14, 2002.

BACKGROUND OF THE INVENTION (1) Field of the Invention

The present invention relates generally to systems and methods for computing a discrete Fourier transform and, more particularly, to systems and methods for designing and providing systolic array architectures operable for computing the discrete Fourier transform or fast Fourier transform.

(2) Description of the Prior Art

Computational schemes for computing the discreet Fourier transform (DFT) have been intensively studied because of their central importance to many digital signal processing applications. A general purpose computer can be programmed to provide this computation but due to the architectural limitations thereof does not operate quickly enough for many applications. Specialized processing circuits are therefore frequently used for this purpose. Such specialized processing circuits of the prior art are primarily based on architectural computing structures for computing the DFT using the fast Fourier transform (FFT) method. These "pipelined" architectures, in which data flows through a chain of functional arithmetic/memory units, contain many different types of memory and logic components, require computing interconnections that usually span the entire circuit, and require formating of input and out data. Thus, they are irregular and difficult to translate into VLSI hardware. In addition they are only able to compute DFTs with limited choices in the number of transform points.

For the most part, the prior art for determining a DFT is not able to utilize or fully benefit from systolic processing structures that permit simultaneous operation of multiple processors to find the DFT by operating on smaller parts of the problem in parallel. The systolic model, introduced in 1978 by Kung and Leiserson, has proved itself to be a powerful tool for construction of integrated, special purpose processors. However, specialized prior art systolic arrays for computing the DFT, either directly or via FFT techniques require excessive arithmetic hardware, especially for large transform sizes, and are slow both in terms of computational latency (time to do a single DFT computation) and computational throughput (time between successive DFT computations).

A systolic architecture as used herein refers to an array of systolic cells, such as simple processors, which can be implemented as integrated circuits to provide efficient, parallel use of a large number of processors to thereby perform multiple simultaneous computations. The data passes from processing element to processing element. Once data has been read from external memory into the array, several computations can be performed on the same datum. The mode of computation is architecturally different from that which performs a memory access each time a data item is used by one or relatively few processors—the latter being a characteristic of the von Neumann architecture. Thus, the systolic array has a major advantage over traditional architectures which are limited by the 'von Neumann bottleneck.'

The processing elements in systolic arrays operate synchronously whereby each cell receives data from its neighboring cells, performs a simple calculation, and then transmits the results (only to its neighbors) one cycle later. Only those cells that are at the edge of the network communicate with the external world, e.g., with I/O circuitry. Thus, the processing elements connect only to the closest neighboring processing elements which may be typically be located north-south, east-west, northeast-southwest, and/or northwest-southeast. In a systolic array, local interconnections from each processing element are each of a length approximately equal to the size of each processing element. In other words, the interconnections are short compared to the dimensions of the integrated circuit. The simplified regular local interconnections of systolic arrays are relatively easier to implement in silicon wafers than complex interconnections found in many circuits. Presently available field programmable gate array (FPGA) based hardware provides enormous flexibility in making design choices.

Prior art non-systolic arrays for computing DFTs or FFTs have utilized an irregular design structure that is not scalable. Because the structure of the prior art circuits is irregular, it is not practical to utilize the same prior designs, only with increased size, to produce a new circuit that would compute a DFT with a different transform length, i.e., the design is not scalable. Therefore, design costs for a specialized application of a non-systolic array remain high because an entirely new design is generally required any time the transform length is changed. Moreover, prior art non-systolic array designs for computing DFTs are severely limited in application because the transform length which they can calculate has to satisfy the restriction $N=r^m$ where N is the transform length, r is the radix, and m is an integer. This exponential restriction significantly limits the practical transform lengths that can be computed, especially for large transform sizes. For example, if r=2 transform lengths between N=4096 (m=12) and N=8192 (m=13) would not be directly computable. Many prior art non-systolic designs use r=4 because this permits significant arithmetic simplification, but practical transform lengths are even more severely limited.

Systolic array designs have been more costly to implement in the prior art for computing DFTs at least in part because they require at least the same number of fixed point complex multipliers as the transform length to be computed. Complex fixed point multiplier processing elements are more costly than complex fixed point adders because they consume considerably more chip area and power. Fixed point means that each transform point is represented by a specific number of binary digits. Thus a word of 16 bits can represent numbers up to $2^{16}$. Floating point numbers allow a lot more flexibility because they use a set of exponent bits to provide a much wider range of values that a specific number of bits can represent. But working with two floating point numbers adds considerable complexity, because the exponents have to be compared and "aligned", which involves a shift of one of the words. Consequently, floating point processing elements have considerable additional complexity that makes them less desirable for in multiple processor applications. The efficiency of such designs in terms of the area of the circuit (which is mainly determined by the number of multipliers) and the time to do successive DFTs, is relatively low. Moreover, the processing elements in prior art systolic array designs often have to be capable of performing both adding and multiplying functions thereby further increasing the cost and circuit area of implementation.

The following patents show attempts to solve the above or related problems:

U.S. Pat. No. 4,777,614, issued Oct. 11, 1988, to J. S. Ward, discloses a digital data processor for matrix-vector multiplication, and comprises a systolic array of bit level, synchronously clock activated processing cells each connected to its row and column neighbors. On each clock cycle, each cell multiplies an input bit of a respective vector coefficient by a respective matrix coefficient equal to +1, −1 or 0, and adds it to cumulative sum and carry input bits. Input vector coefficient bits pass along respective array rows through one cell per clock cycle, Contributions to matrix-vector product bits are accumulated in array columns. Input to and output from the array is bit-serial, word parallel, least significant bit leading, and temporally skewed. Transforms such as the discrete Fourier transform may be implemented by a two-channel device, in which each channel contains two processors of the invention with an intervening bit serial multiplier. Processors of the invention may be replicated to implement multiplication by larger matrices. This type of systolic array requires N complex multipliers and N complex adders, takes at least N time-steps to compute successive DFTs, and has a latency of 2N−1 to do a single DFT. These numbers are far higher than for the systolic method described hereinafter.

U.S. Pat. No. 6,098,088, issued Aug. 1, 2000, to He et al, discloses a real-time pipeline processor, which is particularly suited for VLSI implementation, is based on a hardware oriented radix-$2^2$ algorithm derived by integrating a twiddle factor decomposition technique in a divide and conquer approach. The radix-$2^2$ algorithm has the same multiplicative complexity as a radix-4 algorithm, but retains the butterfly structure of a radix-2 algorithm. A single-path delay-feedback architecture is used in order to exploit the spatial regularity in the signal flow graph of the algorithm. For a length-N DFT transform, the hardware requirements of the processor proposed by the present invention is minimal on both dominant components: Log4N−1 complex multipliers, and N−1 complex data memory.

U.S. Pat. No. 6,023,742, issued Feb. 8, 2000, to Ebeling et al. discloses a configurable computing architecture with its functionality controlled by a combination of static and dynamic control, wherein the configuration is referred to as static control and instructions are referred to as dynamic control. A reconfigurable data path has a plurality of elements including functional units, registers, and memories whose interconnection and functionality is determined by a combination of static and dynamic control. These elements are connected together, using the static configuration, into a pipelined data path that performs a computation of interest. The dynamic control signals are suitably used to change the operation of a functional unit and the routing of signals between functional units. The static control signals are provided each by a static memory cell that is written by a host. The controller generates control instructions that are interpreted by a control path that computes the dynamic control signals. The control path is configured statically for a given application to perform the appropriate interpretation of the instructions generated by the controller. By using a combination of static and dynamic control information, the amount of dynamic control used to achieve flexible operation is significantly reduced.

U.S. Pat. No. 5,098,801, issued Mar. 3, 1992, to White et al., discloses a modular, arrayable, FFT processor for performing a preselected N-point FFT algorithms. The processor uses an input memory to receive and store data from a plurality of signal-input lines, and to store intermediate butterfly results. At least one Direct Fourier Transformation (DFT) element selectively performs R-point direct Fourier transformations on the stored data according to the FFT algorithm. Arithmetic logic elements connected in series with the DFT stage perform required phase adjustment multiplications and accumulate complex data and multiplication products for transformation summations. Accumulated products and summations are transferred to the input memory for storage as intermediate butterfly results, or to an output memory for transfer to a plurality of output lines. At least one adjusted twiddle-factor storage element provides phase adjusting twiddle-factor coefficients for implementation of the FFT algorithm. The coefficients are preselected according to a desired size for the Fourier transformation and a relative array position of the arrayable FFT processor in an array of processors. The adjusted twiddle-factor coefficients are those required to compute all mixed power-of-two, power-of-three, power-of-four, and power-of-six FFTs up to a predetermined maximum-size FFT point value for the array which is equal to or greater than N.

The non-systolic prior art designs discussed above for computing DFTs are irregular, non-scalable, difficult to design, and costly to implement. Prior art systolic designs are more costly and less efficient. Prior art systolic designs require the same number, or more, of complex multipliers than the transform length to be performed. It would be highly desirable to reduce the number of multipliers by at least a factor of four as compared to prior art systolic designs. Prior art systolic systolic designs have not been able to take advantage or radix-4 structures or other bases. The prior art systolic designs require more complicated processing elements that are required to multiply and add. It would be desirable to be able to provide a hardware implementation of a systolic array whereby the processing elements are only required to multiply or add, but not both, and the required number of multipliers is significantly reduced. The base-4 systolic design disclosed herein exploits the computational efficiency of a radix-4 butterfly, yet transform lengths must only be a multiple of sixteen, compared to traditional radix-4 designs which must satisfy N=$4^m$, where N is the transform length and m is an integer. Consequently, those skilled in the art will appreciate the present invention which provides solutions to the above and other problems.

SUMMARY OF THE INVENTION

Accordingly, it is an objective of the present invention to provide an improved system and method for determining a DFT either by direct methods or via FFT techniques.

Another objective is to provide a system and method as aforesaid which comprises a systolic array architecture of processing elements organized with an improved structure.

A further objective is to provide a system and method as aforesaid whereby the structure of the systolic array can be selected to be hardware efficient, and/or scalable, and/or have a high throughput and low latency.

These and other objectives, features, and advantages of the present invention will become apparent from the drawings, the descriptions given herein, and the appended claims. However, it will be understood that the above listed objectives and advantages of the invention are intended only as an aid in understanding aspects of the invention, and are not intended to limit the invention in any way, and do not form a comprehensive list of objectives, features, and advantages.

Accordingly, the present invention provides a method for building/designing a digital hardware processor architecture for computing a discrete Fourier transform. The discrete Fourier transform may be defined by a first equation wherein one or more matrices Z of frequency domain values are equal to one or matrices X of time domain values times a one or more coefficient matrices. The method may comprise one or more steps such as, for example only, providing that the one or more matrices Z of frequency domain values are equal to a plurality of matrices multiplied together wherein at least two of the plurality of matrices have matrix products which involve only or primarily complex number additions.

Additional steps may comprise generating one or more systolic array designs wherein the one or more systolic array designs each comprise a plurality of processing elements. Each of the plurality of processing elements may be adjacent to one or more neighboring processing elements. Each of the plurality of processing elements may be electrically interconnected to at least one of the one or more neighboring processing elements. The method may also comprise determining the digital hardware discrete Fourier transform processor from the one or more systolic array designs.

In a preferred embodiment, the one or more systolic array designs have a structure based on an equation of the form $$Y = W_M^t \cdot C_{M1} X$$

$$Z = C_{M2} Y^t$$

wherein Y, Z, $W^t_M$, $C_{M1}$, $C_{M2}$, and X comprise one or more matrices, and the matrix products $C_{M1}X$ and $C_{M2}Y^t$ involve predominantly complex number additions. In one embodiment of the digital processor architecture wherein base is equal to four, $C_{M1}$ and $C_{M2}$ consists only of elements defined by the set $\{i, -i, 1, -1\}$ and the matrix products $C_{M1}X$ and $C_{M2}Y^t$ consist only of complex additions. In another embodiment, of the digital processor architecture $C_{M1}$ and $C_{M2}$ consists only of elements defined by the set $\{1/\text{sqrt}(2)*(i+1), 1/\text{sqrt}(2)*(-i+1), 1/\text{sqrt}(2)*(i-1), 1/\text{sqrt}(2)*(-i-1), i, -i, 1, -1\}$ wherein the base is 8 and the matrix products would involve a small amount of complex multiplication.

Additional steps comprise providing that the one or more array designs are compatible for use with any transform length which is an integer multiple of 16. Additionally, the plurality of processing elements may be organized into regular blocks of base-4 matrices wherein the one or more array designs are scalable to different transform lengths by varying a number of the regular blocks of base-4 matrices.

In one embodiment of the invention, the one or more array designs comprises a pipelined linear array which is scaleable so that the number of the regular blocks of base-4 matrices are added only to one length dimension of the pipelined linear array to permit processing of an increased transform length. By pipelined linear array it is meant that the length dimension of the array increases or varies with the transform length but the width dimension is constant, e.g., an array wherein the length is N/b and the width is b such that N is the transform length and b is a base such that N is divisible by $b^2$. In a preferred embodiment, b is equal to 4 but the invention comprises the use of other bases as well.

The plurality of processing elements comprise a total number of complex multiplier processing elements of no more than the transform length divided by a base value which is equal to four in the preferred embodiment. However, the base value could use other bases such as eight, sixteen, or other bases which are power of two.

The plurality of processing elements preferably operate synchronously and each of the plurality of complex addition processing elements are not required to both add and multiply. In one embodiment, the digital hardware discrete Fourier transform processor is operable for performing a two-dimensional discrete Fourier transform.

In another embodiment, the invention comprises a digital processor architecture implemented in one or more integrated circuits operable for computing a discrete Fourier transform. The discrete Fourier transform has a transform length N. The processor comprises one or more elements such as, for instance, at least one systolic array formed from a plurality of processing elements. The plurality of processing elements may further comprise a plurality of complex multiplier processing elements and a plurality of complex adder processing elements. The plurality of complex multiplier processing elements are, in one presently preferred hardware efficient embodiment, limited in number to no more than N/4. The plurality of complex adder processing elements are organized into one or more sub arrays of at least one systolic array such that the one or more sub arrays has a first dimension four complex adder processing elements long and a second dimension N/4 complex adder processing elements long.

The digital processor architecture may further comprise a systolic array operable to perform a discrete 2-D DFT of size n1 by n2. This is done by performing a 1-D DFT on the n1 rows (or n2 columns), followed by another 1-D DFT on the n2 columns (or n1 rows), utilizing the same systolic array for all computations.

The digital processor architecture may further comprise a systolic array operable to perform a discrete 1-D Fourier transform of length N, where N=n1*n2. This done by treating computation as a 2-D n1 by n2 DFT as heretofore described.

In these latter two embodiments, the plurality of complex adder processing elements is limited in number to no more than 8*max(n1/4,n2/4) and the plurality of complex multiplier processing elements is limited in number to no more than max(n1/4,n2/4).

In another embodiment, the invention comprises a digital processor architecture for computing a discrete Fourier transform may comprise at least one systolic array formed from a plurality of processing elements for the at least one systolic array. The plurality of processing elements may further comprise a plurality of complex multiplier processing elements and a plurality of complex adder processing elements. The systolic array has a structure based on an equation of the form:

$$Y = W_M^t \cdot C_{M1} X$$

$$Z = C_{M2} Y^t$$

wherein Y, $W^t_M$, $C_{M1}$, and $C_{M2}$ comprise one or more matrices and the matrix products $C_{M1}X$ and $C_{M2}Y^t$ involve only complex number additions in the preferred embodiment.

The digital processor architecture may further comprise memory structures external to the systolic array that contains input values for X and coefficients $C_{M2}$. The plurality of complex multiplier processing elements may comprise internal memory structures capable of storing data values from matrix $W^t_M$.

In one embodiment, the plurality of complex multiplier processing elements may be organized into a one dimensional array that has a length of N/base complex processing elements where N is a transform length of the discrete Fourier transform and the base value is equal to 4 in the preferred embodiment. Moreover, the plurality of primarily complex adder processing elements may be organized into one or more sub arrays of the systolic array with a first dimension complex adder processing elements of width equal to the base and N/base complex adder processing elements long, where the base value is equal to 4 in the preferred embodiment.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawing wherein corresponding reference characters indicate corresponding parts throughout several views of the drawings and wherein:

FIG. 2A. is a schematic for latency optimal, throughput optimal, 1-D DFT systolic designs with variable Z available along the edge of the array for computing a transform length N=64 which are in accord with the present invention;

FIG. 2B is a is a schematic for latency optimal, throughput optimal, 1-D DFT systolic designs with variable X available along the edge of the array for computing a transform length N=64 which are in accord with the present invention.

BRIEF DESCRIPTION OF THE PREFERRED EMBODIMENTS

Figure 1A:
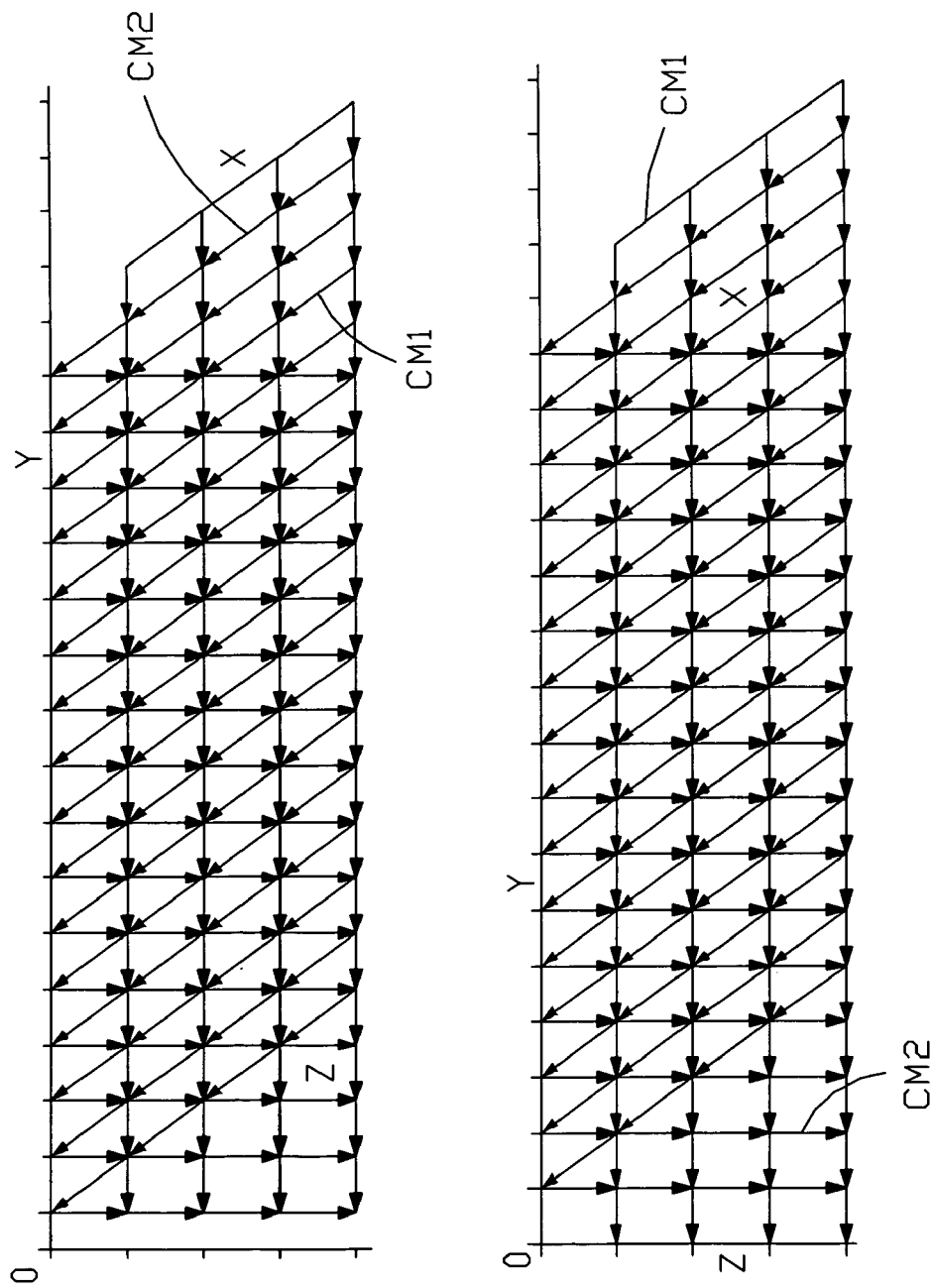
FIG. 1A provides schematics for two minimum area, latency optimal, systolic array designs for computing a transform length N=64 which are in accord with the present invention.

The DFT is defined as $$Z[k] = \sum_{n=1}^{N} X[n] e^{-j(2\pi/N)(k-1)(n-1)} \qquad k = 1, 2 \ldots N \qquad (1)$$

where $X[n]$ are the time domain input values and $Z[k]$ are the frequency domain outputs. It is convenient to represent (1) in the matrix terms $$Z = CX \qquad (2)$$

where C is a coefficient matrix containing elements $W_N^{kn} = e^{-2*j*\pi*(n-1)*(k-1)/N}$. In order to transform C into the desired base-b format it is necessary to find a permutation matrix P that reorders X and Z according to $$X_{b=4} = P \begin{bmatrix} X_1 \\ X_2 \\ X_3 \\ X_4 \\ X_5 \\ \vdots \\ X_{13} \\ X_{14} \\ X_{15} \\ X_N \end{bmatrix} = \begin{bmatrix} X_1 \\ X_{1+N/4} \\ X_{1+N/2} \\ X_{1+3N/4} \\ X_2 \\ \vdots \\ X_{N/4} \\ X_{N/2} \\ X_{3N/4} \\ X_N \end{bmatrix}, \text{ and } Z_{b=4} = PZ. \qquad (3)$$

With this value of P, C can be transformed into $C_b = PCP^t$, so that $Z_b = C_b X_b$. This transformation allows $C_b$ to be written as an (N/b)×(N/b) array of b×b blocks, each block C[i,j] specified by $$C_M[i,j] = W_M[i,j] * c_{D((j-1) \bmod (b))+1} C_{((i-1) \bmod (b))+1} \qquad (4)$$

where $c_{Di} = c_i^t I$ with $c_i$ a b-element vector, $C_i$ is a b×b matrix, each row being $c_i^t$, and $W_M[i, j]$ is an element in the (N/b)×(N/b) matrix, $$W_M = \begin{bmatrix} 1 & 1 & 1 & 1 & \cdots \\ 1 & W^1 & W^2 & W^3 & \cdots \\ 1 & W^2 & W^4 & W^6 & \cdots \\ 1 & W^3 & W^6 & W^9 & \cdots \\ \vdots & \vdots & \vdots & \vdots & \ddots \end{bmatrix}. \qquad (5)$$

With this block reformulation it is possible to factor (2) into $$Y = W_M \cdot C_{M1} X$$

$$Z = C_{M2} Y^t \qquad (6)$$

where "·" in (6) corresponds to an element by element multiply. In (6) $C_{M1}$ and $C_{M2}$ contain $N/b^2$ submatrices $C_B = [c_1|c_2|\ldots c_b]^t$ with the form $$C_{M1} = [C_B^t | C_B^t | \ldots]^t$$

and $C_{M2} = [C_B | C_B | \ldots]$, and Z,X have been redefined for b=4 as follows:

$$Z = \begin{bmatrix} Z_1 & & Z_{N/4} \\ Z_{1+N/4} & \cdots & Z_{N/2} \\ Z_{1+N/2} & & Z_{3N/4} \\ Z_{1+3N/4} & & Z_N \end{bmatrix}, X = \begin{bmatrix} X_1 & & X_{N/4} \\ X_{1+N/4} & \cdots & X_{N/2} \\ X_{1+N/2} & & X_{3N/4} \\ X_{1+3N/4} & & X_N \end{bmatrix}. \quad (7)$$

For base-4 designs (b=4), $$c_1 = \begin{bmatrix} 1 \\ 1 \\ 1 \\ 1 \end{bmatrix}, c_2 = \begin{bmatrix} 1 \\ -j \\ -1 \\ j \end{bmatrix}, c_3 = \begin{bmatrix} 1 \\ -1 \\ 1 \\ -1 \end{bmatrix}, c_4 = \begin{bmatrix} 1 \\ j \\ -1 \\ -j \end{bmatrix}$$

and $C_B$ describes a radix-4 decimation in time butterfly.

By comparing (6) with (2), the computational advantages of the manipulation leading to (6) for base-4 designs are readily evident. In (6) the matrix products $C_{M1}X$ and $C_{M2}Y^t$ involve only additions because the elements of $C_{M1}$ and $C_{M2}$ contain only ±1 or ±j, whereas the product CX in (2) requires complex multiplications. Also, the size of the coefficient matrix $W_M$ in (6) is (N/b)×(N/b) vs. the N×N size of C in (2); consequently the number of overall direct multiplications in (6) is reduced compared to (2). Note that for systolic implementations a distribution of the elements in $C_{M1}$ and $C_{M2}$ does not impose significant bandwidth requirements because full complex numbers are not used.

In a presently preferred embodiment of the invention, equation (6) is utilized within a systolic CAD tool which is capable of allowing the user to specify an algorithm with traditional high-level code, set some architectural constraints and then view the results in a meaningful graphical. A preferred systolic CAD tool may be found at http://www.centar.com under the name SPADE. SPADE takes as input a coded form of a system of non-uniform affine recurrence equation $$w_1(A_1(I)) = g(\ldots w_i(B_{i1}(I)), \ldots) \text{ for all } I \text{ in } I_1$$

$$w_n(A_n(I)) = f(\ldots w_i(B_{in}(I)), \ldots) \text{ for all } I \text{ in } I_n \quad (8)$$

where f,g represent the functional variable dependencies, $I_j$ is the index range for equation j, $w_i$ is one of the algorithm variables and the affine indexing functions are $$A(I) = AI + a; \, B(I) = BI + b. \quad (9)$$

Here, A/a, and B/b are integer matrices/vectors. For each algorithm variable x SPADE finds an affine transformation, T, such that $$T(x) = T_x(A_xI + a_x) + t_x, \quad (10)$$

where $T_x$ is a matrix and $t_x$ is a vector. Thus, $T_x$ and $t_x$ represent affine "mappings" from one index set to another index set, where the latter index set includes one index representing time with the remaining indices representing spatial coordinates. Every variable and its associated calculation receive a unique mapping to "space-time." The projection of the space-time structure along the time axis produces a systolic array after an elemental processing element (PE) is associated with each grid coordinate. In addition to the outputs T,t for each of the algorithm variables, SPADE computes a set of vectors indicating the direction of data flow between PEs for each dependency in the algorithm. SPADE uses an exhaustive search process that examines all combinations of possible transformations to find designs that result in the minimum computation time, defined as the maximum difference between temporal extrema in space-time (latency optimal). To facilitate identification of suitable array designs, SPADE allows the designer to eliminate from the search space designs that fail certain constraint tests that define architectural features. For example, if it is desired that a variable appear only at the PE array edge, then the position points in space-time of that variable's elements, e.g., X[i,j] in (6), must be such that the unit time vector $u_t$ is in the plane of these position points (hence X's projection onto the PE array is a line). This "time align" constraint requires that the normal $n_a$ to the plane of X satisfies $u_t \cdot n_a = 0$. (If it is desired that a variable not project to a line, then a constraint can be set that requires $u_t \cdot n_a \neq 0$.) Also, for the projection of X to be at the edge of the PE array it must constrained to not be within the convex hull of the polygon defining the PE array. Constraints like these are useful because they provide the designer with only the solutions in which he is interested, while considerably limiting the space of possible systolic designs that SPADE has to explore.

Various possible systolic designs may be found by SPADE for calculating the DFT from (6). In this example, the goal was to find architectures which provides the highest throughput, but uses the minimum array area. Even though SPADE uses a minimum latency objective function, the designs it finds are often the most regular and therefore most suitable for providing high throughput. SPADE also provides considerable flexibility in examining non-optimal solutions as well.

To start the design process it is necessary to convert (6) into the coded form for j to N/b do
   for k to N/b do
      Y[j,k]:=WM[j,k]*add(CM1[j,i]*X[i,k],i=1 ... b);    (11)
   od;
   for k to b do
      Z[k,j]:=add(CM2[k,i]*Y[j,i],i=1 ... N/b);
   od;
od;

where b is the base (b=4 in the preferred embodiment) and N is the DFT size. This code follows directly from (6) because the "add" function is interpreted by the SPADE parser as a summation over the index i. SPADE accepts (11), which is a subset of the Maple™ language, directly as input. It can be seen from the loop limits in (13) that it is necessary for the transform length to be divisible by 4.

The analysis process starts by setting all the desired architectural constraints, some of which are discussed herein, and then relaxing these successively in order of the designer's criteria of decreasing importance, if no satisfactory designs are found. Desired architectural constraints are found by examining (11) and (6) in conjunction with typical desired characteristics of systolic arrays. Typically, some experimentation is required to find the best tradeoff between throughput and area.

In this example, it was chosen to select as the most important constraint that the number of complex multipliers be minimized. However, as noted above, the designer is free to select any constraint, for instance maximum speed and uniformity of design. As noted earlier, the products $C_{M1}X$ and $C_{M2}Y^t$ only require complex additions. However, from (11) it can be seen that there has to be a complex multiplication associated with every element Y[j,k] of Y. The multiplications take place at the space-time locations of the elements of Y. Therefore it is desirable in this particular embodiment that Y be time aligned so that it projects onto the PE array as a linear array of multipliers rather than a 2-D array of multipliers. Variables that are time aligned require O(N) memory registers per PE because a 2-D variable is projected onto a linear array of O(N) PEs. Next, it would also be desirable to avoid a network flow of complex data from $W^M$ to Y, because of the bandwidth required to support this. To avoid this possibility, the designer may selectively choose to set SPADE to automatically use the same transformation matrices for both $W_M$ and Y, so that both variables are mapped to the same points in space-time. Finally, for this embodiment of the invention, SPADE constraints were set so that array I/O (X and Z), occurs at array boundaries, while coefficient matrices, $C_{M1}, C_{M2}$, can be constrained to reside in a non-time aligned fashion internal to the PE array. The advantage of this constraint is that edge-based memory structures do not have to be created to distribute array I/O to the systolic array.

Figure 1B:
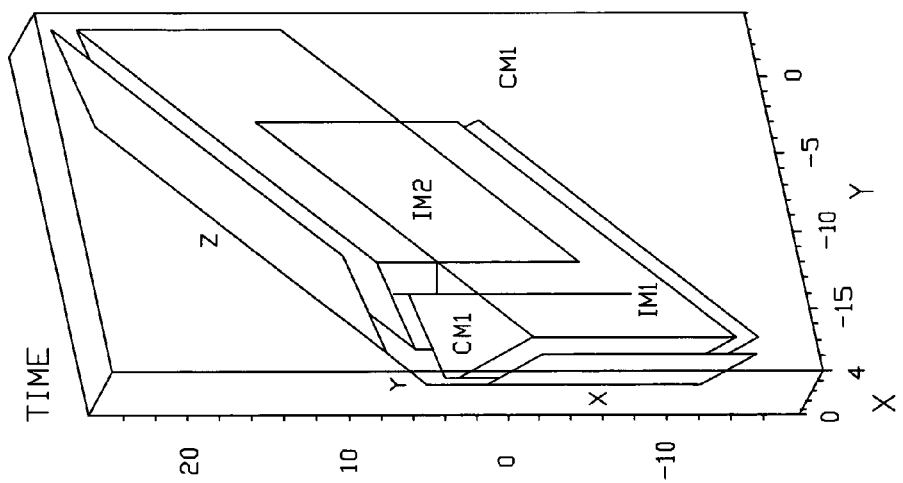
FIG. 1B is space-time view of an array design with a projection in time from the base.

With all the constraints set as described above, SPADE produced several systolic array designs. However, all of the designs found had relatively high latencies, low throughputs and consumed substantial areas. Experimentation revealed that the designs with the lowest latencies, smallest areas and good throughputs required one of either X or Z to be resident internally in the array at the end of a single computation. SPADE found six such latency optimal designs (L=latency=N/2+8) with a "bounding box" area of 5(N/4+5). As a measure of throughput, the number of cycles between successive transform computations is used and denoted by $T^{-1}$ to distinguish it from the transformation matrix T. Each of these designs had the same throughput, $T^{-1}$=N/4+6. For two of the designs $Z/C_{M1}$ were time aligned and for the other four $X/C_{M2}$ were time aligned. An example of a SPADE generated output from each of these categories is shown in FIG. 1A wherein two array designs have been generated. The labels Y, X, Z, CM1, and CM2 shown in FIGS. 1A and 1B indicate the regions of activity associated with the respective variables Y, X, Z, CM1, and CM2. A space-time view of one of these designs is shown in FIG. 1B, and indicates that the space-time mapping is somewhat irregular. The "IM" regions shown in FIG. 1B perform the two running sums associated with the "add" functions in equation (12). The space-time view of FIG. 1B provides an indication of activity within any particular region with respect to time.

The computational efficiency inside the polygons and polytopes in FIG. 1B is 100%, i.e., there is a computation at each internal space-time point each cycle for each variable at which a computation occurs. High computational efficiencies are necessary to achieve the best latencies. However, to achieve the maximum throughput, it is equally important to "fill" the entire space-time volume with computations. In order for this to be possible the spatial structure of the computation, as illustrated in FIG. 1B, must be replicable in time in such a manner that this is geometrically possible. It can been that the space-time structure in FIG. 1B contains irregularities which do not permit a good "fit" between adjacent computational iterations in time.

In order to achieve better throughputs, SPADE was again used to generate solutions with sub-optimal areas, but more regular space-time structures. This does not represent a strong tradeoff because the PE array "areas" are not uniform in FIG. 1A. That is, most of the PEs perform a complex addition, whereas the linear array for PEs associated with the variable Y do complex multiplications. By focusing on systolic arrays with larger areas, two latency optimal (L=N/2+8) and throughput optimal ($T^{-1}$=N/4+1) solutions were found (FIG. 2A and FIG. 2B). Again each of these requires one of either X or Z to be time aligned. That the space-time computation region is efficiently used is demonstrated in FIG. 3 for two successive iterations of the DFT represented by (6). Time increases to right. However, the design in FIG. 3 requires an unusual placement of a linear array of PEs with O(N) memory per PE at the array center.

Figure 3:
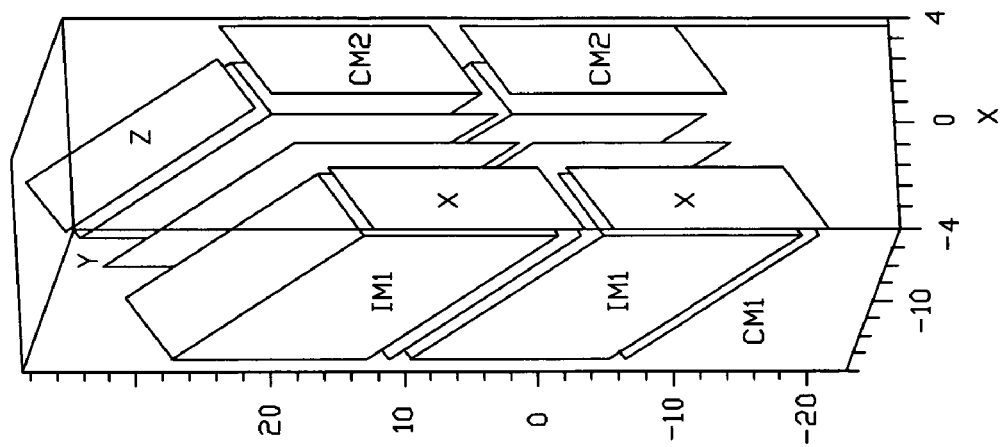
FIG. 3 provides two different perspectives of the space-time view for two DFT iterations corresponding to the systolic array in FIG. 2B. in accord with the present invention.
Figure 3:
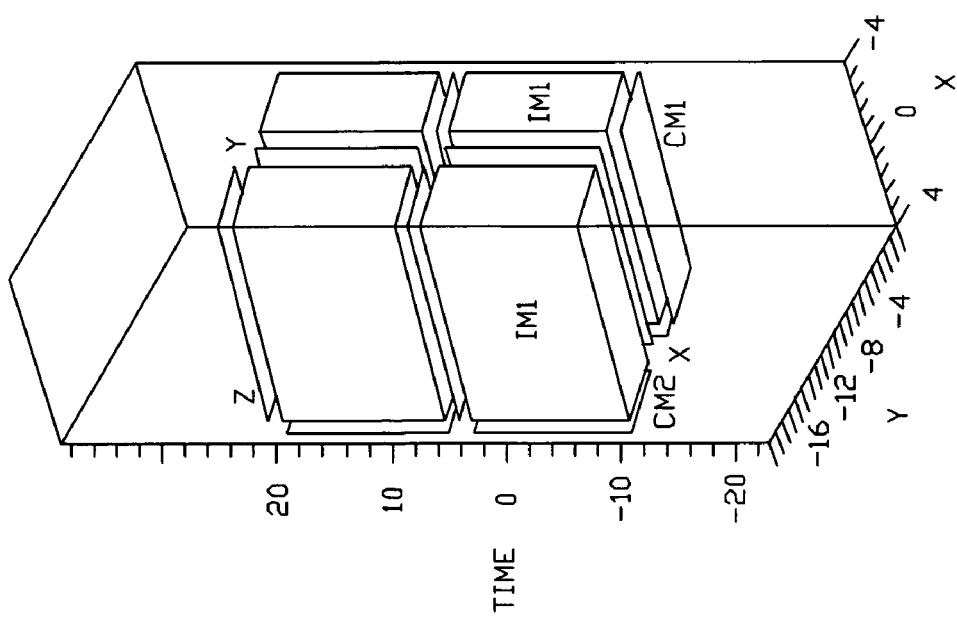

Each of the design types shown in FIG. 1 and FIG. 3 require that X or Z be pre-loaded into or unloaded from the systolic array. In principal this is a disadvantage because extra bandwidth must be provided so that this operation can be "buried" in the computation cycle. However, there is an inherent advantage for the positioning of X and Z in this case because the load/unload would be such that data is sequenced in normal order during this period. This is not a small consideration because input/output formatters can consume considerable amount of space. In order to fully characterize the systolic array designs in FIG. 2 it is necessary to specify the transformation matrices for variables in (11). These are provided in Tables 1 and 2. Table 1 provides the T/t

TABLE 1

Transformation matrices for variables shown in FIG. 2(a)

| var | Y | IM var1 | CM1 | X | Z | IM var2 | CM2 |
|---|---|---|---|---|---|---|---|
| T | $\begin{bmatrix} 1 & 1 \\ 0 & 0 \\ -1 & 0 \end{bmatrix}$ | $\begin{bmatrix} 1 & 1 & 1 \\ -1 & 0 & 0 \\ 0 & -1 & 0 \end{bmatrix}$ | $\begin{bmatrix} 1 & 1 \\ 0 & -1 \\ -1 & 0 \end{bmatrix}$ | | $\begin{bmatrix} -1 & 1 \\ 1 & 0 \\ 0 & -1 \end{bmatrix}$ | $\begin{bmatrix} 1 & 1 & -1 \\ 0 & 0 & 1 \\ 0 & -1 & 0 \end{bmatrix}$ | $\begin{bmatrix} -1 & 1 \\ 1 & 0 \\ 0 & 0 \end{bmatrix}$ |
| t | [5, 0, 0] | [0, 5, 0] | [0, 5, 0] | [0, 5, 0] | [27, −5, 0] | [10, −5, 0] | [10, −5, 0] | matrices for the variables and Table 2 provides the corresponding vectors ([time,x,y]) showing the data flow direction for each dependency in (11). Note that the data flow for two dependencies indicates no spatial movement. This means that the variable remains in the PE to which it was originally assigned and gets reused in that same PE each cycle.

TABLE 2

Dependencies (top) and corresponding propagation vectors (below) for design in FIG. 2(a).

| Y -> IM_var1 | IM_var1 -> CM1 | IM_var1 -> X | Z -> IM_var2 | IM_var2 -> CM2 | IM_var2 -> Y |
|---|---|---|---|---|---|
| [1, -1, 0] | [1, 0, 0] | [1, 0, -1] | [1, 0, 0] | [1, 0, -1] | [1, -1, 0] |

It is useful to briefly compare the present design with prior art designs. A variety of systolic array designs have been proposed for computation of the DFT. These are of two basic types, those that have similarities to systolic arrays for matrix-vector multiplication (Type A in Table 3) and those based on factoring a 1-D DFT into two sets of size $n_1$ and $n_2$ such that $N=n_1 n_2$ (Type B in Table 3). Those array designs in the Type A category have $T^{-1}=N$ and $L=2N-1$. The factorization approach of Type B achieves a significant speedup because it can be done as a 2-D DFT while avoiding the need for a matrix transposition. This results in $T^{-1}=2\sqrt{N}+1$ and $L=4\sqrt{N}$ when $n_1=n_2=\sqrt{N}$. However, all the designs above use a number of complex multipliers and complex adders equal to the transform length.

One of the main advantages of this example of the base-4 approach of the above discussed embodiment is that it achieves good throughputs with reduced hardware complexity as illustrated in Table 3. Specifically, it reduces the number of complex multipliers by a multiple of 4, while the number of complex adders increases only by a multiple of 2 for the same value of N compared to both the previous methods. The main disadvantage of the circuit of this example is that the throughput is proportional to N vs. $\sqrt{N}^{-1}$ for the second approach, so that at some value of N it will be less efficient. In order to estimate a "crossover point" at which this occurs, one can use a complexity measure to determine this. For example, if it is assumed that the complexity measure is "area-time", the area of an adder is ¼ that of a multiplier and $T^{-1}$ is the measure for time, then the crossover point is reached at N≈256. Consequently, the arrays described in this example work best for short transforms.

Both the proposed designs in FIG. 2 and the factorization approach have similar design complexities in that they both require some formatting of incoming or outgoing data, they have the same number of I/O ports, and similar overall bandwidth requirements and arithmetic cycles.

matrices transmit only ±1 and ±j, which requires little bandwidth and consequently only one high bandwidth bus might be required for a linear array.

Figure 4A:
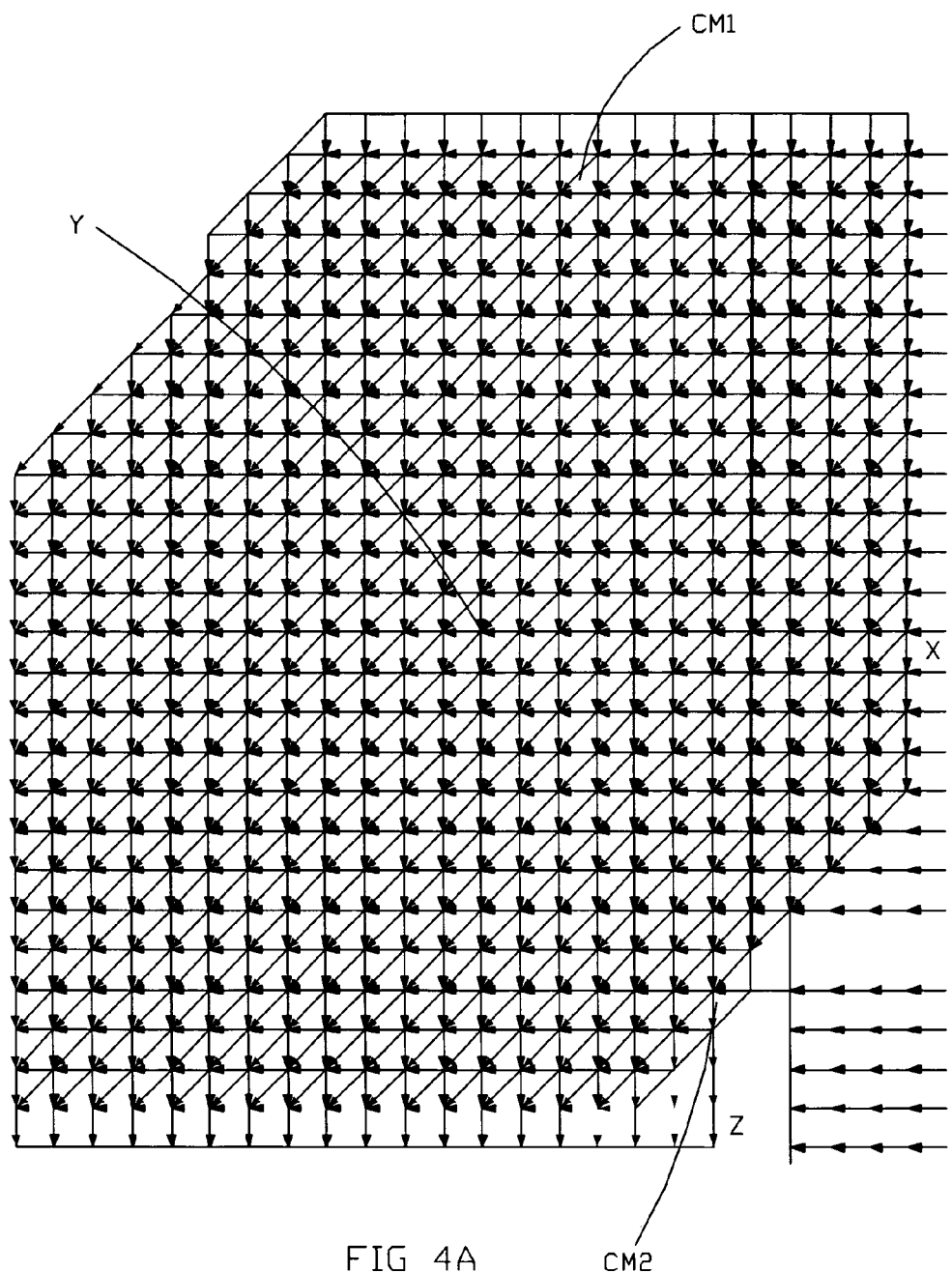
FIG. 4A provides a schematic for a high throughput DFT systolic design which provides the same throughput regardless of the transform length wherein data needs to be formatted for input and output.
Figure 4B:
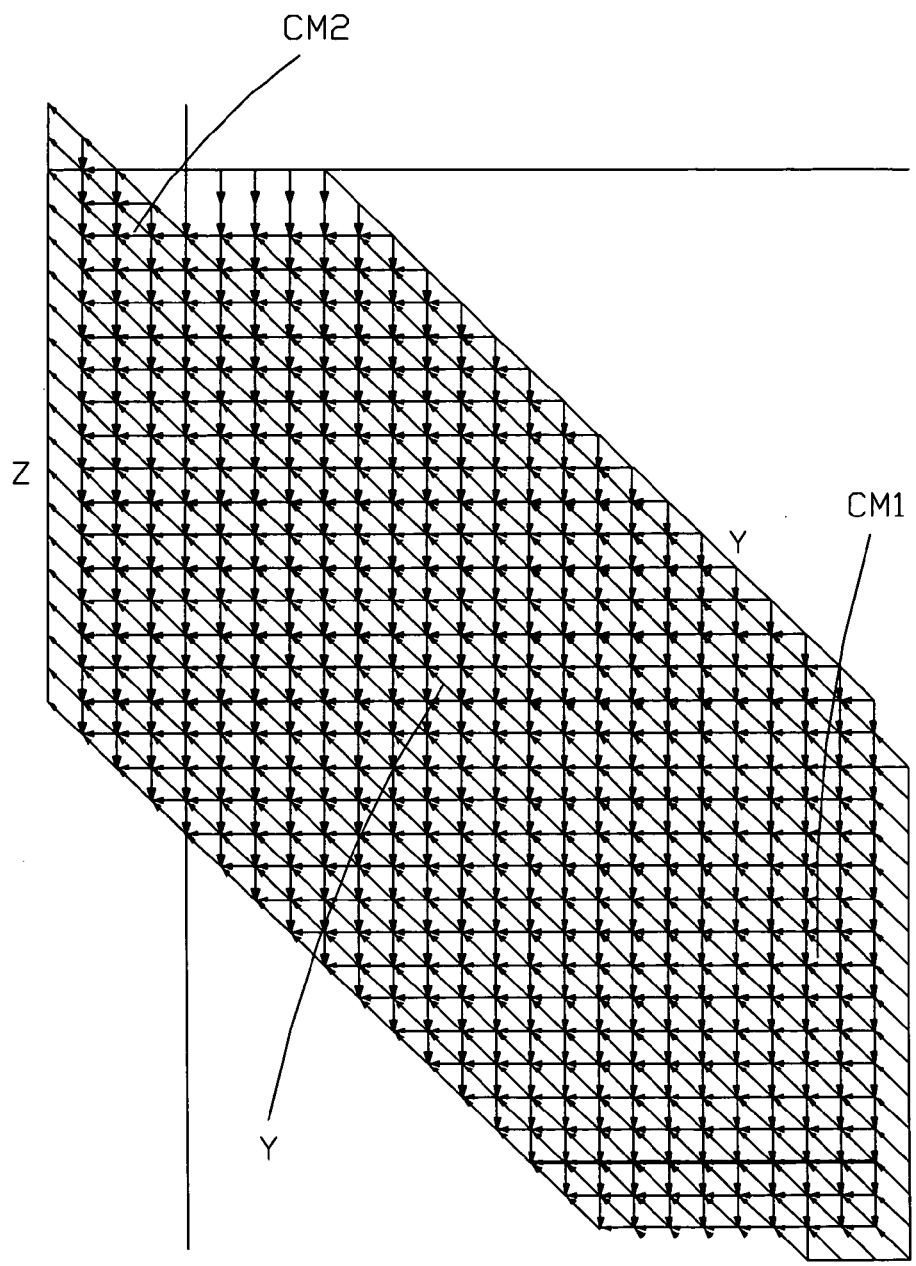
FIG. 4B provides a schematic for a high throughput DFT systolic design which provides the same throughput regardless of the transform length wherein no formatting of X and Y data is necessary because formatting is done internally to the array.

While the above-described embodiment has been directed at achieving cost effective designs with maximum throughputs, the present invention is not intended to be limited to this type of design. For instance, it is also possible to search for designs that achieve maximum throughput irrespective of hardware costs. Here, two such designs are identified as indicated in FIG. 4A and FIG. 4B. The primary constraint placed on all previous SPADE design searches was that the variable Y be time aligned so that only a linear array of multipliers would be produced. However, if this constraint is relaxed, designs can be found that provide significantly improved throughputs, two embodiments of which are shown in FIGS. 4A and 4B. Each of these has $T^{-1}=9$, irrespective of the transform size. The design in FIG. 4A requires data to be formatted for input and output. The design of FIG. 4B requires no formatting of X and Z since the correct formatting is done internally to the array itself ("on-the-fly").

The previous sections discussed systolic designs for b=4; however, from (6) it's clear that there are benefits to using higher bases in that the size of $W_M$ decreases leading to fewer complex multiplications and higher throughputs. We have found that for base-b systolic arrays (FIG. 3)

$$L=2N/b+2b$$

$$T^{-1}=N/b+1$$

which does point to benefits in using a higher base. The primary drawback to using higher bases is that the coefficient matrices $C_B$ no longer contain the simple complex numbers {1, -1, j, -j}, because the coefficients are taken from b points equally spaced on the unit circle. Base-8

TABLE 3

Comparison of different systolic DFT architectures

|  | Type A | | | | Type B | | | | Example of FIG. 2 | | | |
|---|---|---|---|---|---|---|---|---|---|---|---|---|
| N | M | A | $T^{-1}$ | L | M | A | $T^{-1}$ | L | M | A | $T^{-1}$ | L |
| 16 | 16 | 16 | 8 | 31 | 16 | 16 | 9 | 16 | 4 | 32 | 5 | 16 |
| 64 | 64 | 64 | 64 | 127 | 64 | 64 | 17 | 32 | 16 | 128 | 17 | 40 |
| 256 | 256 | 256 | 256 | 511 | 256 | 256 | 32 | 64 | 64 | 512 | 65 | 136 |

(N = DFT transform length,
M = number of multipliers,
A = number of adders,
$T^{-1}$ is a measure of the block DFT computation time and L is the computational latency)

However, if the design of FIG. 3 were collapsed into a linear array, the horizontal buses and PEs could potentially be replaced by an array of registers properly interfaced to an array of adders, which might be a very favorable tradeoff Use could also be made of the fact that the coefficient .

designs still contain many simple complex numbers in $C_B$, leading to a potential significant reduction in hardware, but it is not clear that the overall performance is better than that of the base-4 design. Additionally, it suffers from less regularity in its design.

The present invention may also be utilized to produce 2-D N×N DFT designs based on the same algorithm formulation (6) as that for the 1-D transform. An attractive strategy from an algorithmic point of view would be the use of an N×N arrays of PEs that can perform the column transforms followed by row transforms without the need for a matrix transposition in between as is found in the prior art. However, this 2-D array of multiplier/adders imposes significant hardware penalty. Alternatively, we propose here to build on the less hardware intensive linear designs in FIG. 2 by noting that the output Z of the design in FIG. 2A could be used directly as the input X to the design of FIG. 2B. That is the 1-D column transforms can be done with the array of FIG. 2A, followed by the row transforms using the same array configuration of FIG. 2B. However, for this approach to work directly, it would be necessary to transpose the data in between the row and column DFTs, a very time intensive extra operation.

Alternatively, it is possible to do the transposition "on-the-fly" during the course of the column DFTs performed in FIG. 2a. This can be done by systolic rotation of the elements of the matrices CM1, CM2 and WM as the column DFTs are performed. To illustrate this concept the code in (13) can be altered to do N successive column DFTs including these rotations by writing it as:

for n to N do

After all 64 column DFTs are computed by the array in FIG. 2B, the rows would be distributed over the input PEs X in FIG. 2A which correspond to the output PEs Z in FIG. 2B. The row DFTs could then be performed with another similar set of rotations so that the final 2-D output is in the same radix-4 order as the original input. The rotations occur such that at the end of a row or column DFT, the matrices have returned to their original positions. Also, the twiddle factors in the matrix WM are always in the correct positions for both row and column DFT processing. Note that CM1, CM2, and WM are all matrices, whose elements are fixed for a given transform length N.

Figure 5:
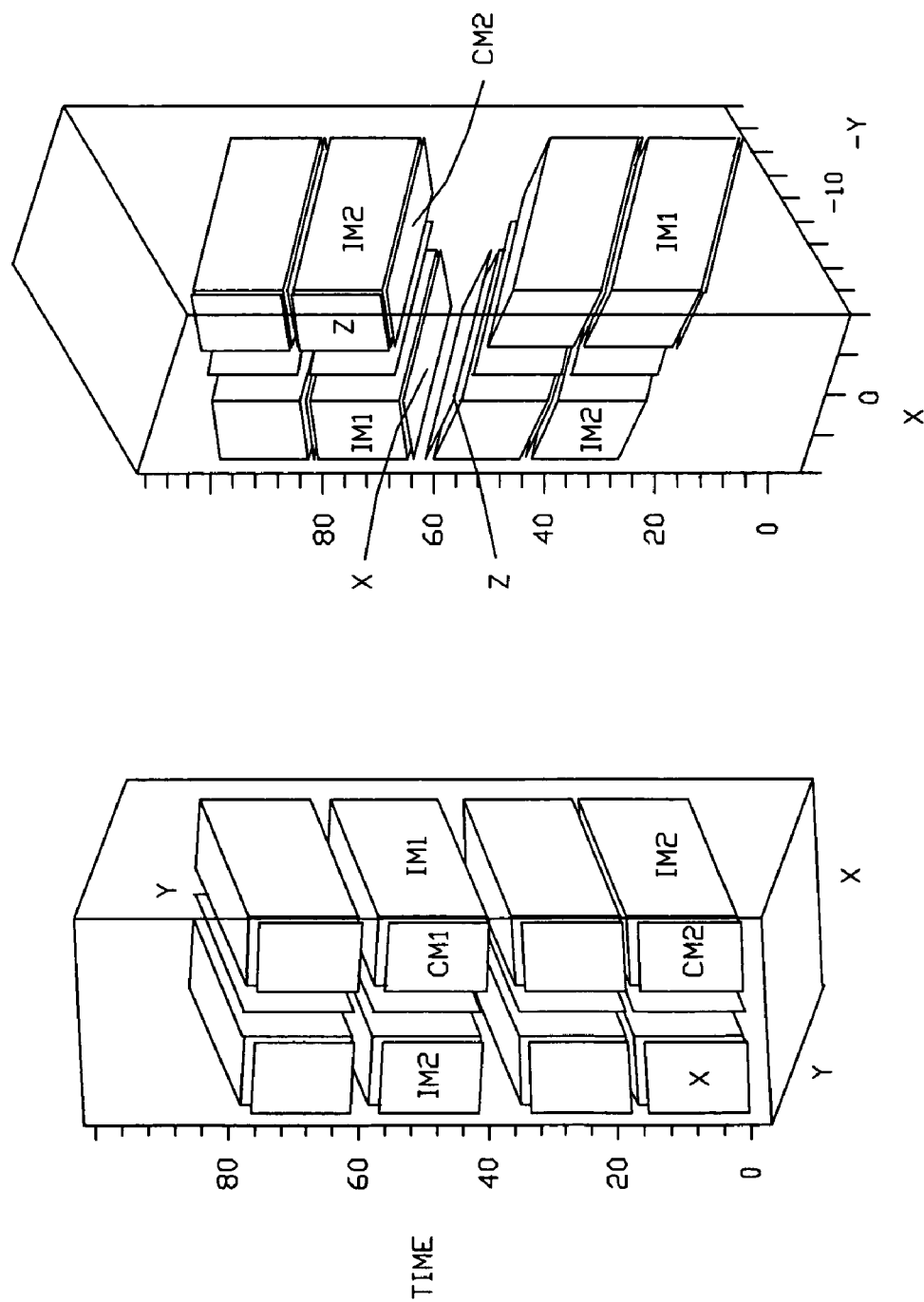
FIG. 5 provides two perspectives of space-time views of two column and two row DFT iterations performed by the systolic arrays in FIGS. 2A and 2B, respectively (N=64), wherein the variable Y is a plane and can be seen in between the IM1 and IM2 variables.

The entire sequence of column and row DFTs is best understood from viewing the systolic computation in the space-time domain as shown in FIG. 5. (Only two of the 64 row and column DFTs are shown.) It can be seen that successive row/column iterations can be "stacked" on top of each other in time so that all PEs are active all of the time and thus that the design is throughput optimal with the exception of the small period of time period at the end of the column DFTs when systolic processing switches from the

```
        for j to N/4 do                                                       (14)
            for k to N/4 do Y[j,k] := WM[j,k]*add(CM1[j,i]*X[i,k],i=1..b) od;
            for k to b do Z[k,j] := add(CM2[k,i]*Y[j,i],i=1..N/4) od;
            WM := matrix_rotate(WM,"down");
            CM1 := matrix_rotate(CM1, "down");
            if n mod(b)=0 then CM2 := matrix_rotate(CM2,"down") fi; od;
        od;
    od;
``` where the procedure "matrix_rotate( )" does a circular rotation of the argument matrices in the direction indicated. Here the rotations of WM and CM1 cause a rotation of the Z output columns one position to the right, and the rotation of CM2 causes Z to be rotated downward by one row. The Z outputs from the code (14) for the first two column DFTs of a 64×64 2-D DFT obtained from this code would then be design of FIG. 2B to that of FIG. 2A. Control of the PEs can be done in a number of ways, as for example using a set of modulo counters in each PE to keep track of that PE's required functionality or propagating control signals along with the data.

A comparison of prior art 2-D systolic array designs for computing the 2-D DFT $$\begin{bmatrix} z_1 & z_2 & z_3 & z_4 & z_5 & z_6 & z_7 & z_8 & z_9 & z_{10} & z_{11} & z_{12} & z_{13} & z_{14} & z_{15} & z_{16} \\ z_{17} & z_{18} & z_{19} & z_{20} & z_{21} & z_{22} & z_{23} & z_{24} & z_{25} & z_{26} & z_{27} & z_{28} & z_{29} & z_{30} & z_{31} & z_{32} \\ z_{33} & z_{34} & z_{35} & z_{36} & z_{37} & z_{38} & z_{39} & z_{40} & z_{41} & z_{42} & z_{43} & z_{44} & z_{45} & z_{46} & z_{47} & z_{48} \\ z_{49} & z_{50} & z_{51} & z_{52} & z_{53} & z_{54} & z_{55} & z_{56} & z_{57} & z_{58} & z_{59} & z_{60} & z_{61} & z_{62} & z_{63} & z_{64} \end{bmatrix}.$$

$$\begin{bmatrix} z_{16} & z_1 & z_2 & z_3 & z_4 & z_5 & z_6 & z_7 & z_8 & z_9 & z_{10} & z_{11} & z_{12} & z_{13} & z_{14} & z_{15} \\ z_{32} & z_{17} & z_{18} & z_{19} & z_{20} & z_{21} & z_{22} & z_{23} & z_{24} & z_{25} & z_{26} & z_{27} & z_{28} & z_{29} & z_{30} & z_{31} \\ z_{48} & z_{33} & z_{34} & z_{35} & z_{36} & z_{37} & z_{38} & z_{39} & z_{40} & z_{41} & z_{42} & z_{43} & z_{44} & z_{45} & z_{46} & z_{47} \\ z_{64} & z_{49} & z_{50} & z_{51} & z_{52} & z_{53} & z_{54} & z_{55} & z_{56} & z_{57} & z_{58} & z_{59} & z_{60} & z_{61} & z_{62} & z_{63} \end{bmatrix}$$

TABLE 4

Comparison of area and time characteristics or base-4 and 2-D systolic implementations. Here M and A correspond to the number of complex multipliers and adders.

|  | 2-D Array | Base-4 Array |
| --- | --- | --- |
| M | $N^2$ | N/4 |
| A | $N^2$ | 2N |
| CPD | 2N + 1 | $N^2/2 + 5N/2 + 8$ |
| L | 4N | $N^2/2 + 9N/4 + 4$ |
| ~area × throughput = (M + A/4) CPD | $5N^3/2 + 5N^2/4$ | $3N^3/8 + 15N^2/8 + 6N$ | and the base-4 design described herein is shown in Table 4.

The base-4 design is very different in that it is pseudo linear because as the transform size increases, it's width remains the same, while its length increases so that it uses O(N) hardware rather than $O(N^2)$ when comparing non-partitioned designs of each. However, when considering throughput and area together, the base-4 design is more efficient by a factor of 6 for N=64, as indicated in Table 4, where it was assumed that the area of an adder was ¼ that of a multiplier. It should be noted that the base-4 design can be used to efficiently perform a 1-D DFT by factoring it into two sets of size $n_1$ and $n_2$ such that $N=n_1 n_2$ in the same way as a prior art 2-D systolic array and performing row and column DFTs on $n_1$ and $n_2$.

The particular implementation of the array hardware from the array designs discussed above is relatively straightforward but is beyond the scope of the invention and depends upon the specific structures of the available hardware, numerous circuit designer choices, the I/O requirements, suitable simulation testing and necessary circuit revisions, and so forth. FIG. 6–FIG. 10 is provided to show a conceptual hardware implementation of a systolic array as discussed above in accord with the present invention. However, it will be understood that these figures are provided only as a generalized or rough example to aid in understanding the invention that provides improved structural concepts, organization, and features of systolic arrays for computing DFT and are not intended to be limiting of the invention. The figures are also not intended to provide a working example which would accordingly require more specific hardware details, hardware design choices, as well as simulation testing, and so forth that is beyond the scope of this discussion. Suitable hardware for systolic array hardware implementation presently includes FPGAs, which are constructed from tiling identical memory and logic blocks along with supporting mesh interconnection networks, in a way that matches the designed systolic array. This type of hardware allows dynamic implementation of systolic designs leading to inexpensive "programmable" systolic array hardware. Use of application specific integrated circuits (ASICS) provides for more efficient and faster implementations, but ones that are not programmable.

Figure 6:
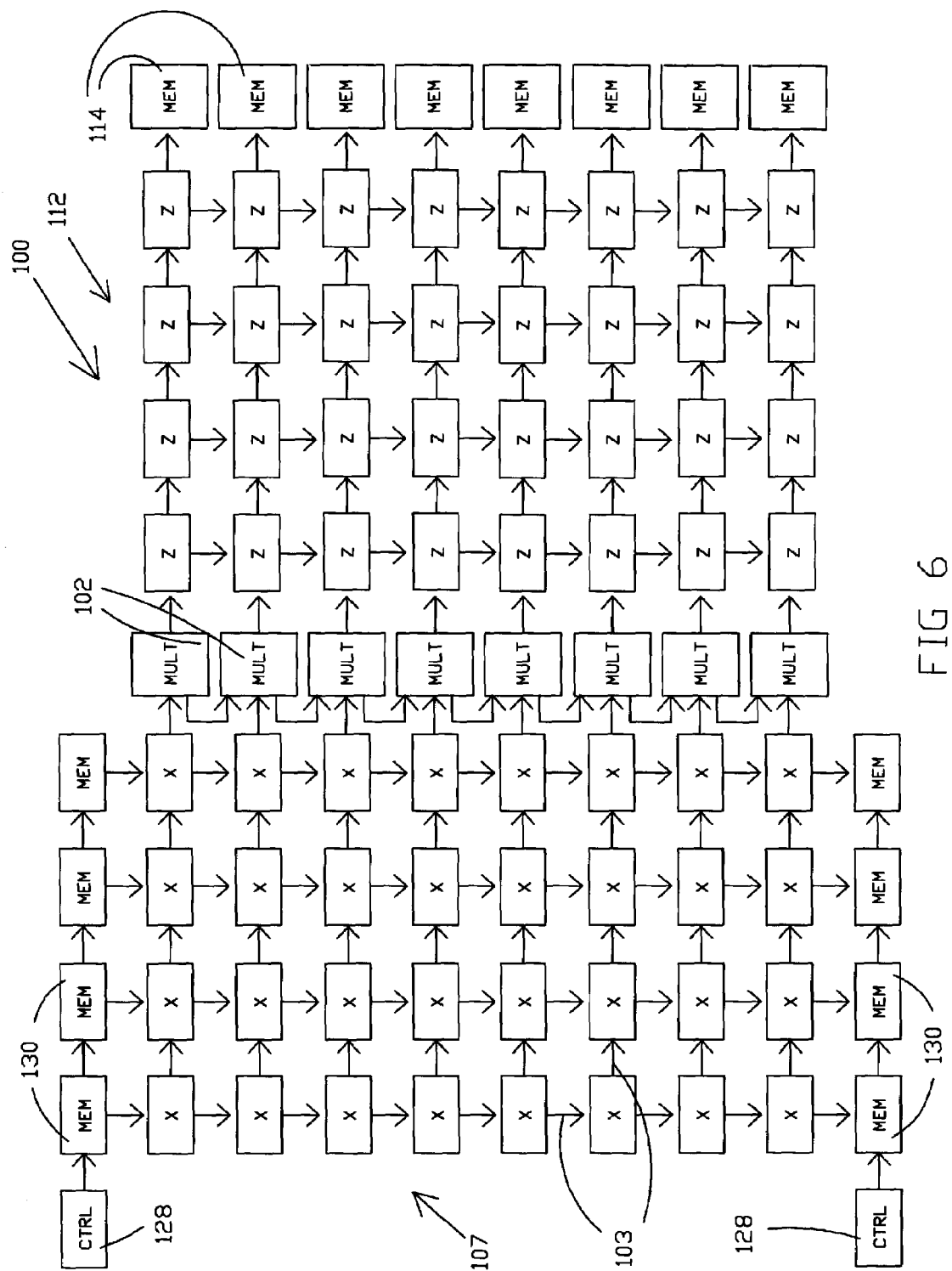
FIG. 6 is a schematic for a hardware efficient DFT systolic design for use with a transform length equal to thirty-two.

Accordingly, in FIG. 6, a view of systolic array hardware implementation 100 for computing the DFT is provided to show the conceptual construction of a hardware implementation similar in design to that of the one-dimension pipelined systolic arrays of FIG. 2A and FIG. 2B but wherein the DFT transform length is thirty-two rather than sixty-four. (The design in FIG. 6 is conceptually a composite of the two designs in FIGS. 2A and 2B, each rotated 180 degrees.) It will be appreciated that, in accord with the present invention, the array designs are easily scalable so that more or fewer components can be added as desired depending on the DFT transform length to be calculated. As can be seen in table 3, for a DFT transform length of thirty-two, eight fixed point complex multiplier processing elements 102 are utilized, and sixty-four fixed point adders are utilized as found in adder array sections 107 and 112. Complex multiplier processing elements form a linear array having a length equal to N/4, e.g., the transform length divided by 4. In the circuit of FIG. 6, where the transform has a length of 32, N/4 will provide a linear array of eight multiplier circuits. As discussed above, the complex multiplier processing elements 102 are utilized for calculating Y from equation (6) internally within systolic array 100.

Array 107 and 112 of complex adders each comprise two linear arrays organized in a 4×N/4 format of complex adder processing elements. In other words, each array 107 and 112 has a width of four complex adder processing elements. Each array 107 and 112 has a length of N/4 complex adder processing elements or eight for this circuit eight complex adder processing elements.

It will be seen in FIG. 6 that the systolic array is comprised of a virtual mesh of North/South and East/West interconnections 103 between the processing elements. For convenience in understanding, the symbolic interconnections 103 have arrows which show the direction of data flow between the processing elements.

External to the systolic arrays of processors are memory structures 130 that contain inputs X (or outputs Z when doing a 2-D DFT). Memory structures internal to adder sub array 112 may be utilized that contain outputs Z (when doing a 1-D DFT). In a preferred embodiment, each PE of the linear array of complex multipliers 102 is capable of storing N/4 complex data values from the matrix W.

Control structures such as control 128 provide clocks that may be utilized to ensure synchronous operation of the processing elements. Internal circuits within each type of PE may be utilized to synchronously control receipt of inputs, computation of results, and distribution of results to adjacent PEs. The control structures are also utilized to reset all PEs such that they are ready to compute another DFT.

If the circuit of the type shown in FIG. 6 is utilized to provide a 2-D DFT as discussed hereinbefore, additional circuitry may be utilized to provide matrix shifts or rotations as heretofore described. In this way, the same array, with the hardware for each array arranged generally in the same manner shown in FIG. 6, could be utilized for processing the 1-D column and row DFTs, which when combined would provide a 2-D DFT.

Figure 7:
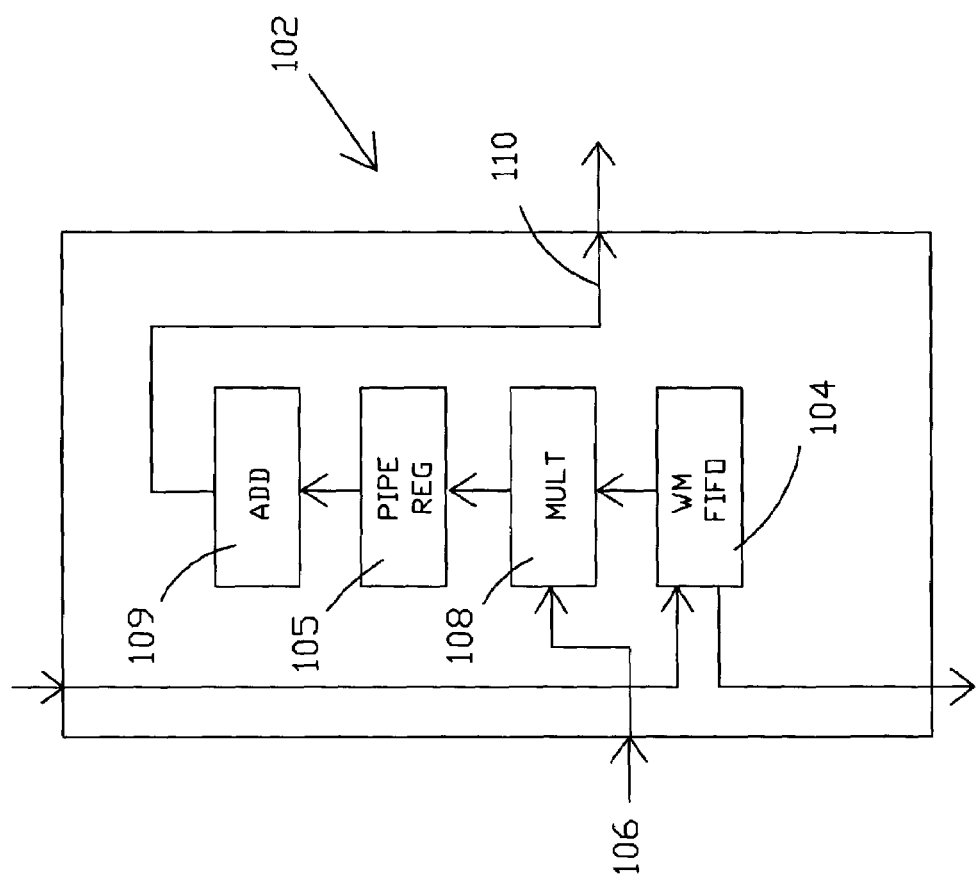
FIG. 7 is a schematic for complex multiplier processing element for use in the circuit of FIG. 6.

FIG. 7 provides an enlarged view of the one possible conceptual configuration for complex multiplier processing element 102. Within complex multiplier processing elements 102, matrix $W_M$ is inserted and/or stored in FIFO element 104. The product $C_{M1}X$ is applied to input 106 from adder array section 107 whereupon complex multiplication of $W_M$ times $C_{M1}X$ takes place in 108. The results may be stored and added in pipe register 105 and adder 109 and then passed on at output 110 to adder array section 112 to effect the product $C_{M2}Y$ as described hereinbefore which involves only addition due to the construction of matrices $C_{M1}$ and $C_{M2}$. When doing a 2-D DFT, the 1-D DFTs that have been performed can be transferred from the internal registers in 112 to memory elements 114. The these results can be retrieved from 114 to do the 1-D row DFTs.

Figure 8:
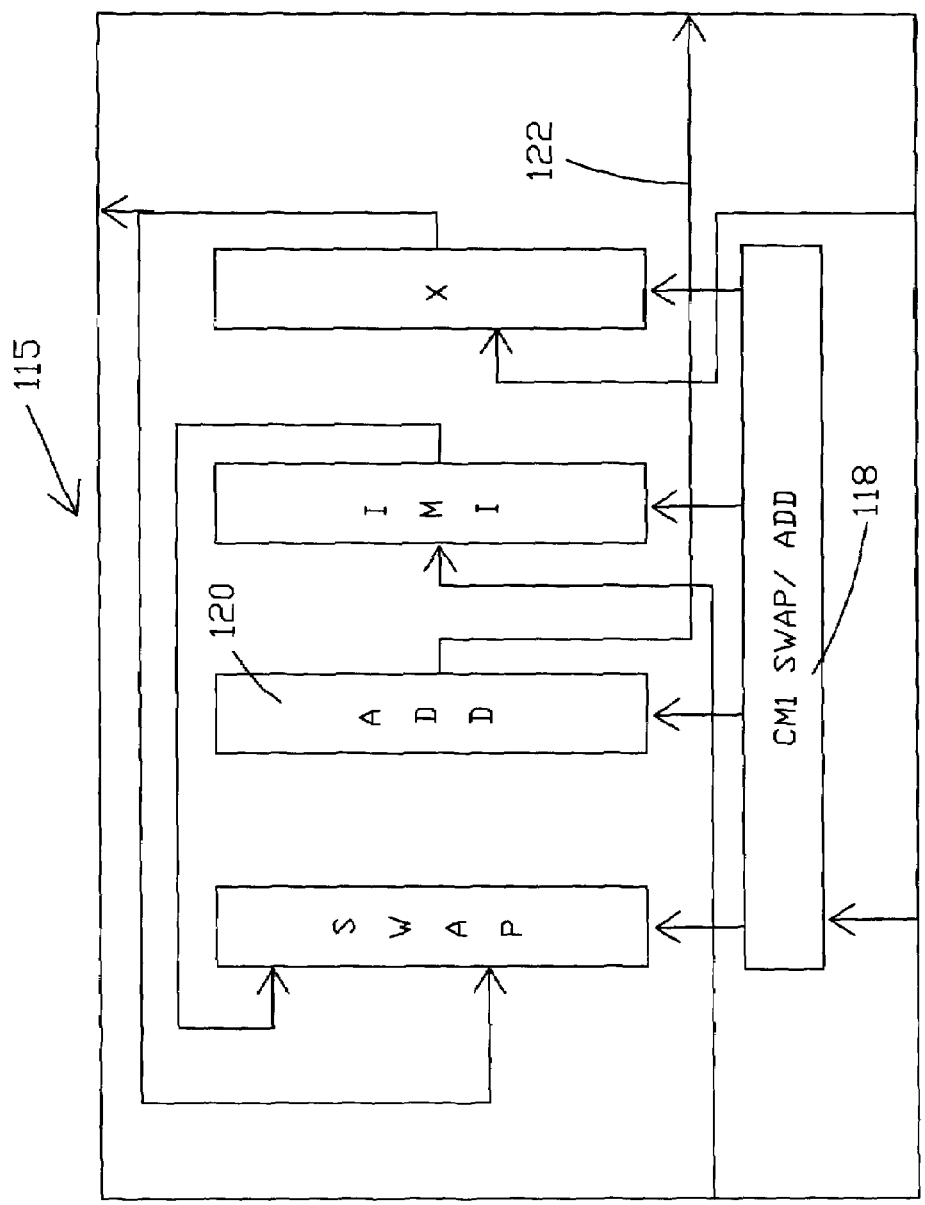
FIG. 8 is a schematic for a complex adder processing element for use in an adder array for the circuit of FIG. 6.
Figure 9:
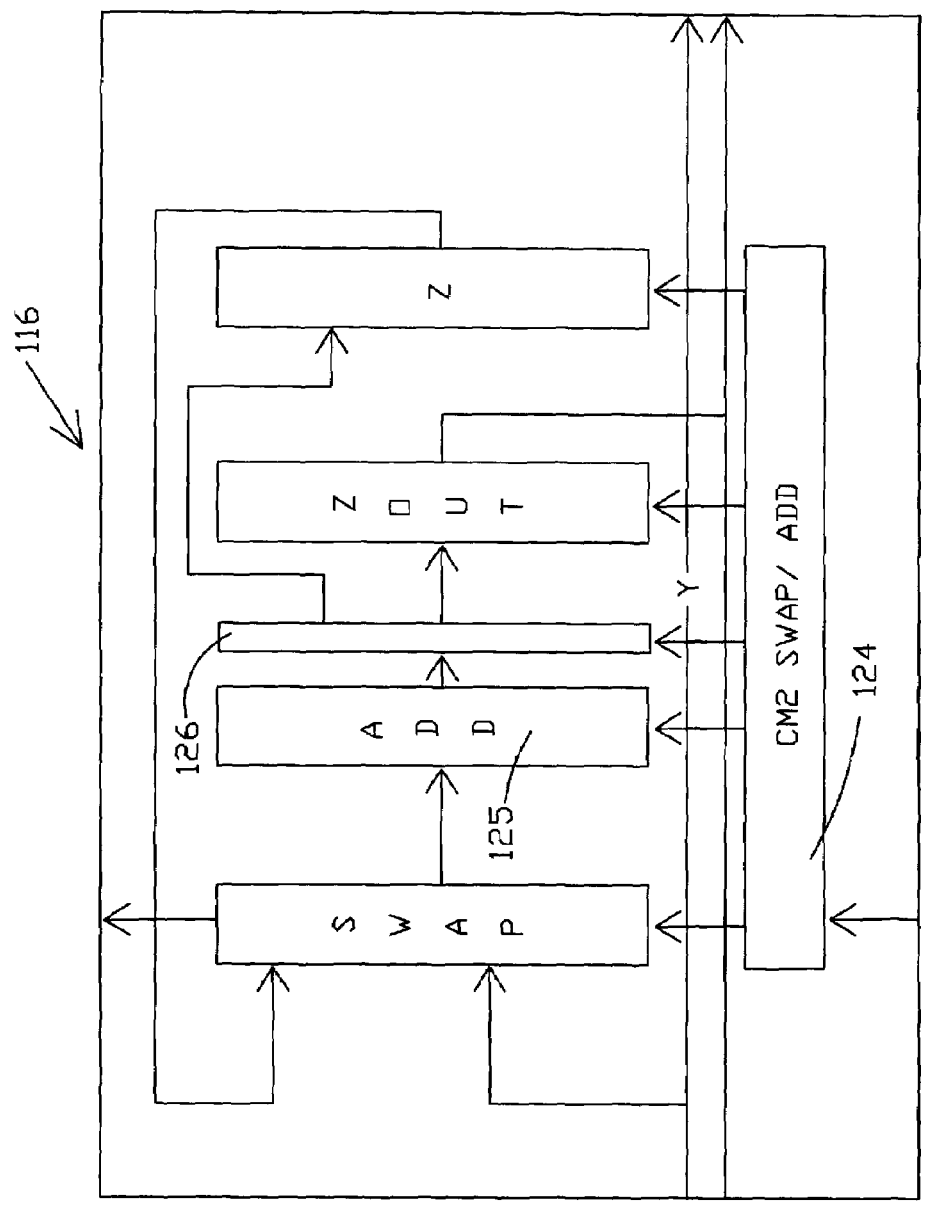
FIG. 9 is a schematic for a different complex adder processing element from that of FIG. 8 for use in an adder array for use in the circuit of FIG. 6.

FIG. 8 and FIG. 9 provides enlarged views of possible conceptualized embodiments for complex adder processing elements 115 and 116 which may be utilized in adder array section 107 and adder array second 112, respectively. Complex adder processing element 115 is utilized to multiply (which requires only addition as discussed above) $C_{M1}X$. Elements 118 may control synchronization, operation, inputs and outputs of processing element 115 to thereby receive $C_{M1}$ and X whereupon the sum is determined element 120, the result of which is transferred to output 122 in accord with the flow direction of information as indicated in FIG. 2B and FIG. 6. Likewise, in complex fixed point adder processing elements 116, control of operations may be performed by control element 124. $C_{M2}$ and/or Z may be placed in storage element 126. Y is received from the multiplier array. It will be understood that the individual processing elements such as adders and multipliers may vary in construction as desired. However, in accord with systolic array concepts, the architecture of the individual processing elements will be duplicated. Therefore, in this example, all adders in adder array section 107 are identical. Likewise the adders in array section 112 for this embodiment are identical but may not exactly identical with those of array section 107. Moreover the multipliers 102, which form a linear array, are the identical to each other. The use of the repeated structures in systolic arrays is a significant cost benefit of such devices.

Figure 10:
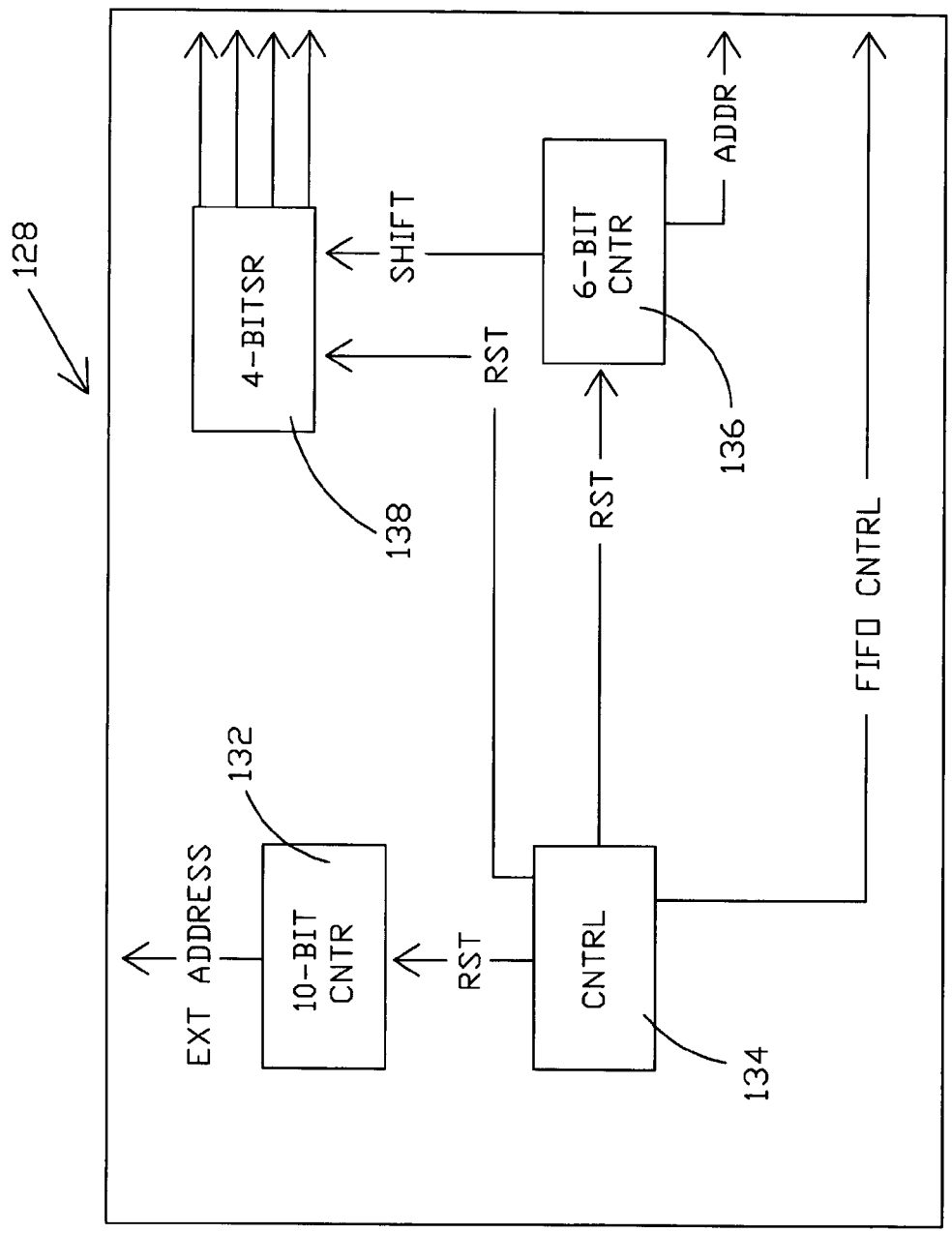
FIG. 10 is a schematic for control element for use in the circuit of FIG. 6.

Control and memory elements, such as control elements 128 and memory elements 130 may be utilized to input data such as time domain data X into systolic array hardware implementation 100 to perform the DFT thereon. One possible conceptual implementation for control element 128 is shown in FIG. 10. Element 132 is utilized to interface with external instrumentation that provides the time domain data X or, in other implementations, could provide frequency domain data. Controllers 134 and 136, as well as register 138, operate to input the time domain data into memory elements 130 whereby the data may be inserted into adder array section 107 and array activity such as add and multiply functions are coordinated.

In summary, it will be seen that numerous different systolic arrays can be derived from or generated utilizing the present method that is based on arrays derivable from equation (6), including one dimensional as well as two dimensional arrays and/or multi-dimensional arrays. The generated arrays can be selected to provide a very economical but efficient systolic array structure implementation as indicated FIG. 2A or 2B and FIG. 6. To compute larger DFT transform length, it is only necessary to scale the array.

For instance, the conceptualized circuit of FIG. 6 is scaled for a DFT transform length of thirty-two but by increasing the one-dimensional pipeline systolic array configuration, it is easily altered to provide for a DFT transform length of 64 as shown in FIG. 2A or FIG. 2B. The number of multipliers is greatly reduced by a factor of at least four as compared to the prior art systolic devices and the number of adders is only increased only by a factor of two. Thus, the number of multiplications is greatly reduced. This compares very favorably with prior art non-systolic designs because the transform length, in presently preferred embodiments, need only be an integer multiple of sixteen whereas in the prior art non-systolic radix-4 designs must satisfy $N=4^m$ where N is the transform length and m is an integer. However, the present invention is not intended to be limited to these transform lengths except in the particular embodiments thereof as described in the accompanying claims which specifically include this limitation. There are no prior art radix-4 systolic designs. Radix-4 designs in the past have only been associated with non-systolic special purpose "pipelined" FFTs. Moreover, equation (6) can also be utilized to construct hardware that very quickly computes the DFT, regardless of transform size, as indicated in FIG. 4.

The arrays can also be designed to reduce I/O requirements and/or other requirements that may apply to specific computation needs of a particular instrument.

Therefore, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A digital processor architecture for computing a discrete Fourier transform, said discrete Fourier transform having a transform length N and a base b, said processor comprising:
    at least one systolic array formed from a plurality of processing elements, said plurality of processing elements comprising a plurality of complex multiplier processing elements and a plurality of complex adder processing elements, said plurality of complex multiplier processing elements in said at least one systolic array being limited in number to no more than N/4, and whereby N must be divisible by $b^2$.

2. The digital processor architecture of claim 1, wherein said plurality of complex adder processing elements are organized into one or more sub arrays such that said one or more sub arrays have a first dimension comprising four complex adder processing elements and a second dimension comprising N/4 complex adder processing elements.

3. The digital processor architecture of claim 1, wherein said plurality of complex adder processing elements are not operable for multiplying functions other than unity multiplication.

4. The digital processor architecture of claim 1, further comprising:
    said at least one systolic array is operable to perform a discrete Fourier transform having a transform length of n1 and also operable to perform a discrete Fourier transform of length n2, whereby N=n1*n2.

5. The digital processor architecture of claim 1, wherein a structure of said one or more arrays has a structure based on equations of the form:

$$Y = W_M^t \cdot C_{M1} X$$

$$Z = C_{M2} Y^t$$

wherein Y, Z, $W_M^t$, $C_{M1}$, $C_{M2}$, and X comprise one or more matrices, and the matrix products $C_{M1}X$ and $C_{M2}Y^t$ involve only complex number additions.

6. The digital processor architecture of claim 1, wherein said plurality of complex adder processing elements in said at least one systolic array is limited in number to no more than 2N.

7. A digital processor architecture for computing a discrete Fourier transform, said discrete Fourier transform having a transform length N, said processor comprising:
    at least one first systolic array comprising a first plurality of processing elements, said at least one systolic array being organized into one or more first subarrays, each first subarray having a number of processing elements equal to N divided by a base b and wherein N is an integer multiple of $b^2$ and said base being equal to a power of two, and whereby N must be divisible by $b^2$.

8. The digital processor architecture of claim 7, further comprising at least one second systolic array comprising a second plurality of processing elements, said at least one systolic array being organized into one or more second subarrays, each second subarray having a number of processors equal to the product of N divided by a base $b^2$ times b and wherein N is an integer multiple of $b^2$ and said base being equal to a power of two.

9. The digital processor architecture of claim 7, further comprising said at least one first systolic array being operable to perform a discrete Fourier transform having a transform length of n1 and also operable to perform a discrete Fourier transform of length n2, whereby N=n1*n2.

10. The digital processor architecture of claim 9, further comprising shifting circuitry operable to provide shifts or rotations of matrix elements to support on-the-fly permutations of data for use in performing 1D or 2D discreet Fourier transforms.

11. A digital processor architecture for computing a discrete Fourier transform, said discrete Fourier transform having a transform length N, wherein N is an integer, said processor comprising:
- at least one systolic array comprising a first plurality of processing elements;
- at least one multiplier subarray forming a portion of said at least one systolic array, said at least one multiplier array consisting of N divided by a base b linearly aligned multiplier systolic elements whereby N must be divisible by $b^2$; and
- at least two complex adder subarrays, each of said at least two complex adder arrays with a first dimension consisting of N/b adder systolic elements, and a second dimension consisting of b adder systolic elements.

12. The digital processor architecture of claim 11, wherein b=4 and N is an integer multiple of 16.

13. The digital processor architecture of claim 11, wherein said adder systolic elements comprise complex adder elements and said multiplier systolic elements comprise complex multiplier elements.

14. A digital processor architecture for computing a discrete Fourier transform, said discrete Fourier transform having a transform length N, wherein N is an integer, said processor comprising:
- at least one systolic array comprising a first plurality of processing elements;
- at least one multiplier subarray forming a portion of said at least one systolic array, said at least one multiplier array having a first dimension consisting of N/b multiplier systolic elements whereby b is a base and N must be divisible by $b^2$; said at least one multiplier array having a second dimension consisting of N/b multiplier systolic elements; and
- at least one adder subarray forming a portion of said at least one systolic array, said at least one adder array comprising systolic elements which are at least primarily adder systolic elements, said at least one adder subarray consisting of an order of N times an order of N systolic elements.

15. The digital processor architecture of claim 14, wherein b=4 and N is an integer multiple of 16.

16. The digital processor architecture of claim 14, wherein said adder systolic elements comprise complex adder elements and said multiplier systolic elements comprise complex multiplier elements.

17. The digital processor architecture of claim 14, wherein said at least one adder subarray is in surrounding relationship to said at least one multiplier array.

* * * * *